United States Patent [19]
Uemachi et al.

[11] Patent Number: 5,413,882
[45] Date of Patent: May 9, 1995

[54] COMPOSITE ELECTRODE

[75] Inventors: Hiroshi Uemachi; Yoshiko Sato; Tadashi Sotomura; Kenichi Takeyama, all of Osaka, Japan

[73] Assignee: Matsushita Electric Industrial Co., Ltd., Osaka, Japan

[21] Appl. No.: 950,476

[22] Filed: Sep. 24, 1992

[30] Foreign Application Priority Data

Sep. 24, 1991 [JP] Japan .................. 3-243087

[51] Int. Cl.$^6$ ............................................. H01M 4/60
[52] U.S. Cl. ................................ 429/213; 429/218
[58] Field of Search ............................ 429/213, 218

[56] References Cited

U.S. PATENT DOCUMENTS

| | | | |
|---|---|---|---|
| 4,155,874 | 5/1979 | Nodiff et al. | 429/213 |
| 4,375,427 | 3/1983 | Miller et al. | 252/512 |
| 4,496,638 | 1/1985 | Sugiuchi et al. | 429/213 |
| 4,808,496 | 2/1989 | Hope et al. | 429/192 |

FOREIGN PATENT DOCUMENTS

| | | | |
|---|---|---|---|
| 0143968 | 6/1985 | European Pat. Off. . | |
| 0145843 | 6/1985 | European Pat. Off. . | |
| 0176877 | 4/1986 | European Pat. Off. . | |
| 0415856 | 3/1991 | European Pat. Off. . | |
| 48-24229 | 3/1973 | Japan . | |
| 0009967 | 1/1981 | Japan | 429/213 |
| 0019867 | 2/1981 | Japan | 429/213 |
| 62-213063 | 9/1987 | Japan . | |

*Primary Examiner*—David B. Springer
*Attorney, Agent, or Firm*—Ratner & Prestia

[57] ABSTRACT

A reversible electrode is provided comprising mainly organic disulfide compounds and having applications in such electrochemical devices as batteries, electrochromic displays, sensors, memories, etc. Large current charge/discharge is realized at room temperature with charge/discharge characteristics of excellent reversibility. Its structure is a composition combining organic disulfide compounds with disulfide bonding and conducting polymers. In other words, conducting polymers after being subjected to an electrolysis are put together with organic disulfide compounds. Thus, due to the effect of composition with conducting polymers, the oxidation/reduction reactions of organic disulfide compounds are accelerated and a reversible electrode characterized by utilization of a high energy density of organic disulfide compounds and the possibility of a large current charge/discharge is realized.

10 Claims, 1 Drawing Sheet

COMPOSITE ELECTRODE

BACKGROUND OF THE INVENTION

This invention relates to a reversible electrode comprising mainly organic compounds for use as an electrochemical element in batteries, electrochromic display devices, sensors, memories, and the like.

Since the discovery of conducting polyacetylene electrodes made by Shirakawa et al. in 1971, a practical application of using conduction polymers electrodes has been actively pursued. When conducting polymers are employed as electrode materials, a realization of such electrochemical devices as a light battery of a high energy density, an electrochromic display device of a large display area, a biochemical sensor using a microelectrode etc. can be expected.

However, the problem is that polyacetylene is not chemically stable against the moisture and the oxygen which exist in the air and it cannot be used practically as the electrode for electrochemical devices. In order to solve the aforementioned problem, an introduction of other conducting polymers of electron conjugated system has been studied with a resultant finding of such relatively stable polymers as polyaniline, polyprole, polyacene, polythiophene, etc. These polymers have been used for development of lithium secondary batteries.

Not only cations but also anions within electrolyte are involved with the electrode reaction of these polymer electrodes. Since the electrolyte is serving as a carrier of ions and at the same time is involved with a battery reaction, a certain quantity of electrolyte corresponding to battery capacities needs to be held within the battery. As a result, battery's energy density is reduced for the aforementioned quantity of electrolyte to 20-50 Wh/kg, about one half of that of an ordinary secondary battery such as a nickel cadmium battery, a lead-acid battery and the like.

As an approach to solving the aforementioned problem by use of organic materials having potentially a high energy density, use of organic disulfide compounds was proposed in a European patent, No. 415856. The foregoing compounds are expressed generally by a formula of X—S—R—S—(S—R—S)$_n$—S—R—S—X', wherein n is 0 or any integer from 1 and above, X and x' are a metal M, an alloy containing the metal M, a hydrogen atom or an organic terminal function group, R is a cyclic compound comprising a carbon atom combined with at least one sulfur atom S of thiol.

The S—S bond of this compound is broken down by an electrochemical reduction and a salt represented by R—S—M$^+$ is formed by bonding with a cation M$^+$ contained in the electrolyte. Also, this salt is characterized by returning to the original R—S—S—R by an electrochemical oxidation. In addition, in the aforementioned European patent is proposed a metal-sulfur secondary battery wherein a metal M for releasing or capturing cation (M$^+$) is put together with an organic disulfide compound with a resultant energy density of at least 1000 Wh/Kg, considered comparable with or exceeding that of an ordinary secondary battery.

The fact that the oxidation reaction of organic disulfide compounds is promoted by the addition of a low molecule, flavin, which is an organic compound of nitrogen containing conjugated systems, is described in Journal of the American Chemical Society, Vol. 97, No. 11, pp. 3235-3238, (1975).

In other words, it is mentioned that the sulfur atoms contained in organic disulfide compounds and capable of disulfide bonding are bonded with the nitrogen atoms of organic compounds of nitrogen containing conjugated system with a resultant promotion of reaction.

However, only the reaction velocity is dealt with in the aforementioned paper and anything about the oxidation promotion effect caused by organic compounds of nitrogen containing conjugated system against organic disulfide compounds is not measured nor discussed from an electrochemical approach. Besides, nothing at all is mentioned in the foregoing literature about the fact that, by using organic disulfide compounds together with conducting polymers as the organic compounds of nitrogen containing conjugated system for promoting the oxidation/reduction reaction, electrodes having an excellent reversibility in organic solvents at room temperature, capable of handling large charging/discharging currents, can be produced.

Although the addition of conducting polymers to organic disulfide compound electrodes as a conducting material or a collector material simply like carbon, etc. is mentioned in the specification of the aforementioned European patent No. 415856, the fact that conducting polymers promote the oxidation/reduction reaction in electrolysis of organic disulfide compounds is not at all referred to.

Particularly, the fact that the conducting polymers, prepared by polymerization of a monomer having a structure wherein nitrogen atoms are conjugated with carbon atoms, interact with organic disulfide compounds serving as a catalyst is not touched upon.

As reported in an embodiment of the specification of the European patent No. 415856, a battery built by using [(C$_2$H$_5$)$_2$NCSS—]$_2$ for example shows small discharge/charge currents of 13 $\mu$A/cm$^2$ and 6.5 $\mu$A/cm$^2$ respectively in its charge/discharge performance.

According to a battery reaction theory, the electron mobility process in the electrochemical reaction of these materials is progressing very slowly and their usage is limited to the high temperature ranges of 100°-200° C.

It is difficult to drain a practically required current as large as at least 1 mA/cm$^2$ for example at room temperature.

SUMMARY OF THE INVENTION

A reversible electrode is provided which has a high energy density, capability of large current charging/discharging even at room temperature and charge/discharge characteristics of excellent reversibility.

Furthermore, a reversible electrode is provided, which is capable of large current charging/discharging even in organic solvents or at room temperature and is excellent in reversibility, by utilizing organic disulfide compounds and also conducting polymers serving as an organic compound of a nitrogen containing conjugated system to promote oxidation/reduction reactions of the organic disulfide compounds.

Such conducting polymers as polyaniline and the like are most suited as the organic compounds of a nitrogen containing conjugated system having electric conductivity. Therefore, the electrode of this invention comprises organic disulfide compounds having disulfide bonding and conducting polymers as its main components.

The conducting polymers combined with the organic disulfide compounds are put together, with polyaniline and disulfide acting as the electrode catalyst when electrochemical oxidation/reduction of the organic disulfide compounds is taking place. Consequently, the potential difference between oxidation and reduction reactions of the organic disulfide compounds becomes 0.1 V or below and electrode reactions are promoted and a large current electrochemical reaction (charge/discharge) even at room temperature can be realized.

By mixing compounds having disulfide bonds with conducting polymers, a composite electrode utilizing disulfide bonding oxidation/reduction for electrode reactions can be realized with the electrode serving as an electrode catalyst for reducing activation energy of reactions during the electron transfer process and, at the same time, working to increase the effective areas of reactions taking place with electrolyte. In other words, the potential difference between oxidation and reduction reactions is more than 1 volt when disulfide compounds alone are used, but in contrast it is reduced to as low as 0.1 volt or below due to the interaction taking place between disulfide groups and conducting polymers. Thus, electrode reactions are facilitated and at the same time the effective areas in contact with electrolyte are expanded, resulting in realization of a large current electrochemical charge/discharge even at room temperature.

DETAILED DESCRIPTION OF THE INVENTION

A reversible electrode of this invention's embodiment is explained here with the help of drawings.

EXAMPLE 1

A sample solution is prepared by adding aniline, to a concentration of 1M (mol/l), to 0.5M $Na_2SO_4$ sol. which is adjusted to pH=1.0 by a sulfuric acid.

A polyaniline film of about 20 $\mu$m in thickness is formed on a graphite electrode by applying a controlled potential electrolysis polymerization to the aforementioned solution at the voltage of 1.2 to 1.5 V applied to a reference electrode, which uses a saturated calomel electrode.

The polyaniline film thus prepared is washed by distilled water and dried to obtain a polyaniline modified electrode.

Separately, an organic disulfide compound, 2, 5-dimercapto-1, 3, 4-thiadiazole, is added to a concentration of 5 mM to an acetonitrile solution which has 1M of $LiClO_4$ dissolved in it. The aforementioned polyaniline modified electrode is placed in this solution and a controlled potential electrolysis is applied with +0.8 V kept against an Ag/AgCl reference electrode to obtain a composite electrode of polyaniline-2, 5-dimercapto-1, 3, 4-thiadiazole.

Next, an evaluation of the thus prepared composite electrode of polyaniline-2, 5-dimercapto-1, 3, 4-thiadiazole is made as follows.

Figure 1:
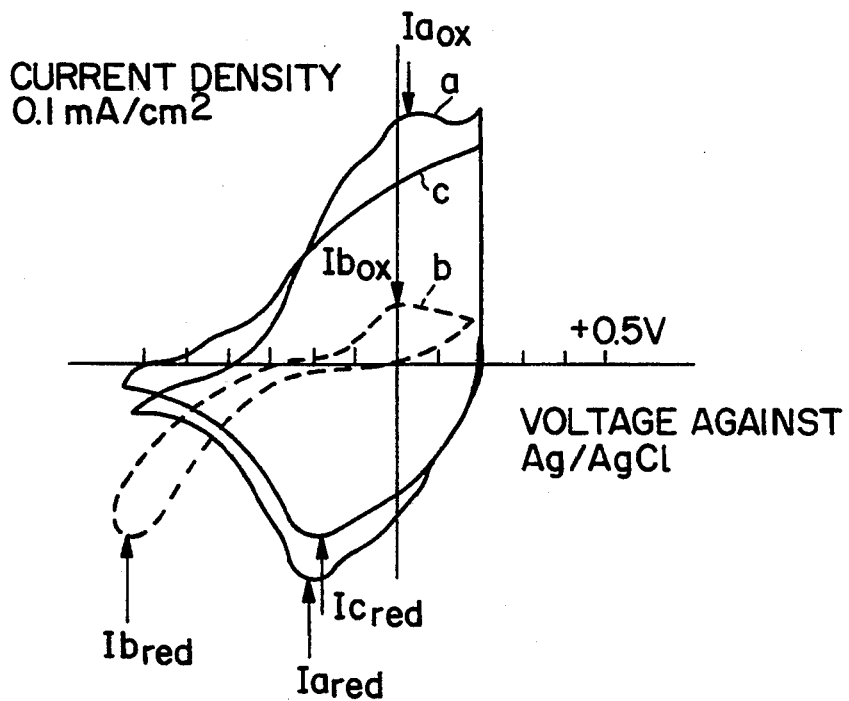
FIG. 1 shows current density-voltage characteristics of a reversible electrode of an embodiment of this invention together with those of a conventional electrode.

A current density-voltage characteristic curve (a) as shown in FIG. 1 is obtained about the composite electrode of polyaniline-2, 5-dimercapto-1, 3, 4-thiadiazole by having its potential changed linearly over a range of −0.7 to +0.2 V at a speed of 50 mV/sec with the composite electrode placed in an acetonitrile solution which has 1M of $LiClO_4$ as electrolyte dissolved in it. (1M $LiClO_4$/acetonitrile solution)

In addition, for a comparison purpose, a graphite electrode having only a thin film of polyaniline, namely, a polyaniline modified electrode, is place in the foregoing acetonitrile solution and a current-voltage characteristic curve (c) is obtained about polyaniline by the same method of measurement.

Also, a graphite electrode without any polyaniline thin film is placed in the foregoing 1M $LiClO_4$/acetonitrile solution with 5 mM of 2, 5-dimercapto-1, 3, 4-thiadiazole dissolved further in it and a current-voltage characteristic curve (b) is obtained about 2, 5-dimercapto-1, 3, 4-thiadiazole by the same method of measurement.

What is evident on comparing those curves (a), (b) and (c) is as follows:

A peak of current, at around −0.2 V, $Ic_{red}$, of the curve (c) is a reduction peak of polyaniline.

A peak of current at around −0.6 V, $Ib_{red}$, of the curve (b) is a reduction peak of 2, 5-dimercapto-1, 3, 4-thiadiazole and one near 0 V, $Ib_{ox}$, is an oxidation peak.

A peak of current near −0.2 V, $Ia_{red}$, of the curve (a) is a reduction peak of polyaniline-2, 5-dimercapto-1, 3, 4-thiadiazole composite electrode.

It is observed with the current peaks corresponding to oxidation/reduction of 2, 5-dimercapto-1, 3, 4-thiadiazole that the position of the reduction peak, $Ib_{red}$, is shifted from −0.6 V to that of −0.2 V, $Ia_{red}$, by combining 2, 5-dimercapto-1, 3, 4-thiadiazole with polyaniline.

In other words, oxidation/reduction reactions of 2, 5-dimercapto-1,3,4-thiadiazole are activated by the presence of polyaniline.

When there is only 2,5-dimercapto-1,3,4-thiadiazole, the difference between oxidation/reduction peaks, namely $Ib_{ox}$ and $Ib_{red}$, is as large as 0.6 V.

The speed of oxidation/reduction reactions is rather slow. A battery using only 2,5-dimercapto-1,3,4-thiadiazole as the positive electrode becomes a battery to show a great reduction in efficiency under a large current charge/discharge since the voltage variance at the times of charge/discharge may exceed 0.6 V.

In contrast to this, when a composite electrode of polyanilin-2,5-dimercapto-1,3,4-thiadiazole is used as the positive electrode of a battery, that battery can have an excellent efficiency even under a large current charge/discharge showing a small voltage change between charge and discharge.

EXAMPLE 2

Porous powdered polyaniline having a fibril structure and an average particle size of 0.3 $\mu$m is synthesized by having a conducting polymer of aniline chemically polymerized in an acidic solution with boric copper (II) fluoride used as oxidizing agent.

One weight part of this powdered polyaniline, one weight part of an organic disulfide compound of 2,5- dimercapto-1,3,4-thiadiazole and 0.1 weight part of carbon black are mixed in toluene wherein low density polyethylene (Excelene VL-200, density=0.9, prepared by Sumitomo Chemical Industries) is dissolved, and then coated over a stainless steel net and dried to complete a sheet of composite electrode with 100 μm or so in thickness.

A solid battery A of 28 mm by 28 mm in dimensions is made of the foregoing composite electrode serving as the positive electrode, a bridged polyethylene oxide film (prepared by Dai-Ichi-Kogyo Pharmaceutical) as the electrolyte and lithium metal as the negative electrode.

After this battery is charged for 17 hours under a constant voltage of 3.6 V at room temperature, the battery's current-voltage characteristics are examined by measuring battery voltages with the battery discharged for 3 seconds each with 1 μA, 10 μA, 100 μA, 500 μA and 1 mA respectively.

Figure 2:
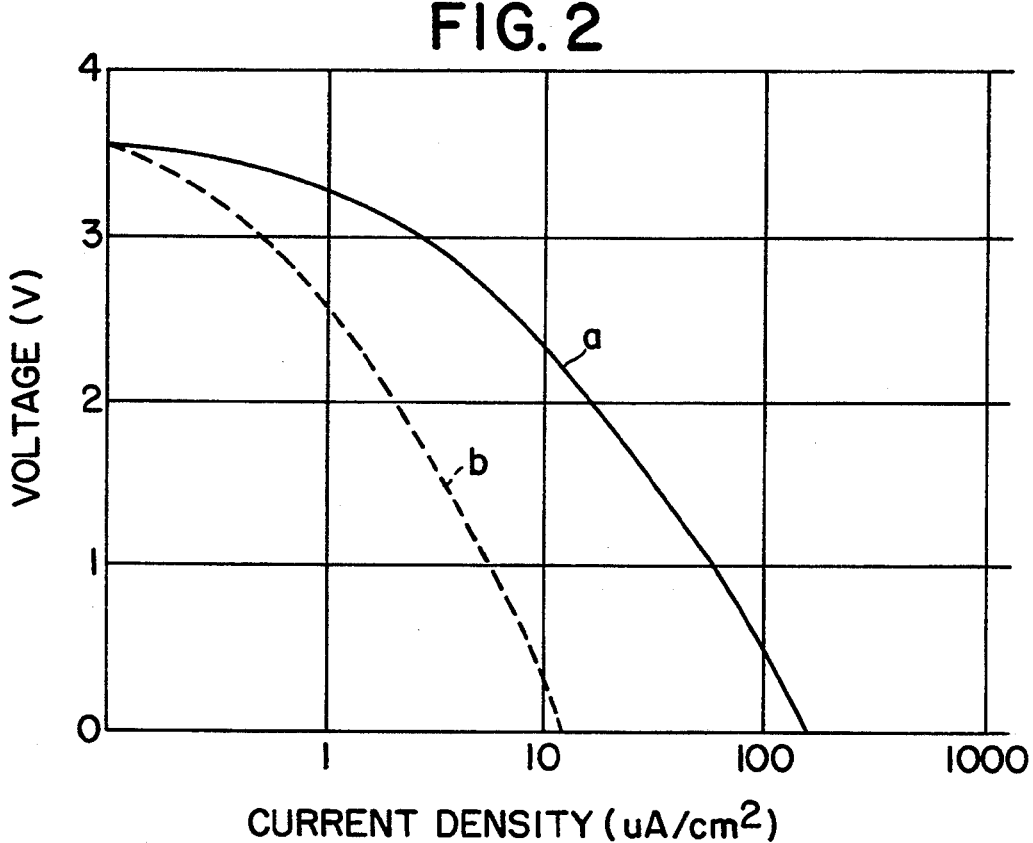
FIG. 2 shows a comparison of current density-voltage characteristics between a battery having a reversible electrode of an embodiment of this invention as the positive electrode and metal lithium as the negative electrode and a conventional battery.

The results are represented by the curve (a) in FIG. 2.

For a comparison purpose, a battery B employing a sheet electrode of about 100 μm in thickness is prepared by the same method as above except for containing no polyaniline powder.

The current-voltage characteristics of this battery are shown by the curve (b) of FIG. 2.

The polarization of the battery A is small compared with that of the battery B and larger currents can be drained from the battery A.

An application of a composite electrode made in a battery is explained in this example, but by using the composite electrode of this example as the counter electrode it becomes possible to produce an electrochromic device having a quick coloring/decoloring response and an electrochemical analog memory of a fast write-/read speed.

The reversible electrode as used in the above example of the embodiment of this invention is characterized by comprising at least organic disulfide compounds in possession of disulfide bonding and conducting polymers, and in addition to the aforementioned compounds such materials as ion conducting polymers, electron conducting materials, mechanical strength reinforcing polymers, and the like can also be used according to the requirement for achieving the same effect.

Here in this example, as described in European patent No. 415856, a compound expressed by a general formula of X—S—R—S—(S—R—S)$_n$—S—R—S—X' is used as the aforementioned organic disulfide compound. In the general formula, n is 0 or any integer from 1 and above, X and X' are a metal M, an alloy containing the metal M, a hydrogen atom or an organic terminal function group, and R is a 2-functional cyclic compound comprising a carbon atom combined with at least two sulfur atoms S of thiol.

Further, a cyclic compound of R is a heterocyclic compound and each respective sulfur atom bonded with the heterocyclic compound a conjugated bonding with at least one nitrogen atom of the heterocyclic compound.

Furthermore, a compound comprising uracil, thiadiazole, triazine or pyrazine is used as the foregoing R compound. More specifically, 2,5-dimercapto-1,3,4-thiadiazole as expressed by $C_2N_2S(CH)_2$), S-triazine-2,4,6-trithiole as expressed by $C_3H_3N_3S_3$ and the like are used as the organic disulfide compounds.

Also, when a part or whole of the aforementioned organic disulfide compound is electrochemically oxidized, the both ends take the form of a SRSM group respectively. That is, in the above formula, both X and X' are M, so that the formula for this subgenus reads M—S—R—S—(S—R—S)$_n$—S—R—S—M. Here, the symbols S, R and M stand for the same contents as defined in the foregoing.

In addition, the conducting polymers as used in the reversible electrode of this invention are the ones that show an electrode catalyst activation against the aforementioned organic disulfide compounds. The conducting polymer having catalytic activity contains nitrogen atoms and comprises monomers wherein the foregoing nitrogen atoms conjugate with carbon atoms. Further, the monomers composing the conducting polymers comprise aniline, diaminonaphthalene or diaminobenzene.

The typical conducting polymers as used in this example of the embodiment of this invention are the polymers of aniline, ortho-diaminobenzene, ortho-diaminonaphthalene and the like.

These conducting polymers are able to show an oxidizing/reduction reaction of high reversibility over the range of −1.0 V to +1.0 V against an Ag/AgCl electrode. Besides, the conducting polymers that can form a porous fibril structure, wherein organic disulfide compounds are retainable, are preferred.

As the metal ions to form salts at the time of reduction of the organic disulfide compounds, protons can also be used in addition to alkali metal ions, alkaline earth metal ions, and divalent transition metal ions as referred to in the aforementioned European patent.

When lithium ions are used as alkaline metal ions, a battery of 3 V to 5 V can be built by using lithium metal or lithium alloys like lithium-aluminum, etc. as the electrode for supplying/capturing lithium ions and an electrolyte capable of conducting lithium ions. Also, when protons are used as metal ions, a battery of 1 V to 2 V can be made by using a metallic hydride like LiNi, etc. as the electrode for supplying/capturing protons and an electrolyte capable of conducting protons.

Putting an organic disulfide compound together with a conducting polymer can be made according to the widely known method of mixing, impregnation, eutectic processing, multilayer coating and the like.

For example, after a layer of polyaniline, a conducting polymer, of fibril structure is formed on a stainless steel substrate by electrochemical polymerization, a salt of an organic disulfide compound can be impregnated into the fibril layer and a composite electrode thus completed. Also, by having particles of an organic disulfide compound dispersed in a solution of a conducting polymer and then eliminating the solvent, layers of the conducting polymer are formed on the surfaces of the organic disulfide compound particles to complete a composition process.

Further, the conducting polymer particles produced by either chemical or electrochemical polymerization can be mixed with organic disulfide compound particles for composition.

Some of the conducting polymers, like polyphenylenediamine, etc. for example, that may be combined with organic disulfide compounds in accordance may be combined exhibit conductivity only in the presence of acid. In this case, the electrode catalyst reaction is promoted by the presence of acid (hydrochloric acid, sulfuric acid, acetic acid, etc.) at the electrode.

As clarified by the foregoing examples of the embodiment of this invention, a composite electrode of this invention combining an organic disulfide compound and a conducting polymer makes it possible to perform electrolysis under a large current which has, prior to the instant invention, been difficult to accomplish using only organic disulfide compounds.

Thus, it is possible now to provide a high energy density secondary battery capable of charging/discharging at a large current by employing a composite electrode of this invention for the positive electrode and lithium metal for the negative electrode.

What is claimed is:

1. A composite electrode consisting essentially of:
   a) at least one organic thiol group-containing compound, said thiol group-containing compound having at least two thiol groups bonded to a heterocyclic ring structure selected from uracil, thiadiazole, triazine and pyrazine, when under an electrochemical reduction state, wherein said organic thiol group-containing compound is converted to a polymeric material by the formation of disulfide bonds from said thiol groups when under an electrochemical oxidation state and is reversibly depolymerized by reconversion of said disulfide bonds to said thiol groups when again under an electrochemical reduction state, and
   b) at least one electrically conductive polymer selected from the group consisting of polyaniline polyaminoaniline and polydiaminobenzene, said electrically conductive polymer comprising a conjugated system of nitrogen and carbon atoms having $\pi$-electrons.

2. A composite electrode according to claim 1, wherein said polymeric material having disulfide bonds under an electrochemical oxidation state has the formula X—S—R—S(S—R—S)$_n$—S—R—S—X', wherein n is 0 or any integer from 1 and above, X and X' are each selected from a metal, an alloy containing the metal, and a hydrogen atom, S is a sulfur atom, and R is said selected heterocyclic ring structure and wherein the voltage range of said electrochemical oxidation state is 1.5 to 5.0 volts.

3. A composite electrode according to claim 2, wherein said metal is selected from the group consisting of an alkali metal, an alkaline earth metal and a transition metal that has two outer-shell electrons and that appears in group III B, IV B, V B, VI B, VII B, VIII, I B or II B and in the 4th, 5th or 6th period in the periodic table.

4. A composite electrode according to claim 2, wherein said metal is lithium.

5. A composite electrode according to claim 2, wherein an end of said organic thiol group-containing compound, when electrochemically oxidized, takes a form selected from the group consisting of X—S—R—S— and X'—S—R—S—.

6. A composite electrode according to claim 1, wherein said electrically conductive polymer containing a conjugated system of $\pi$-electrons has catalytic activity against said organic thiol group-containing compounds.

7. A composite electrode consisting essentially of:
   a) at least one organic thiol group-containing compound having at least two thiol groups bonded to a functional group selected from uracil, thiadiazole, triazine and pyrazine, when under an electrochemical reduction state, wherein said organic thiol group-containing compound is converted to a polymeric material by the formation of disulfide bonds from said thiol groups when under an electrochemical oxidation state and is reversibly depolymerized by reconversion of said disulfide bonds to said thiol groups under an electrochemical reduction state, and
   b) at least one electrically conductive polymer selected from the group consisting of polyaniline polyaminoaniline and polydiaminobenzene, said electrically conductive polymer comprising a conjugated system of nitrogen and carbon atoms having $\pi$-electrons, and
   c) an acid.

8. A composite electrode according to claim 1 wherein said thiol group-containing compound is selected from 2,5-dimercapto-1,3,4-thiazole and S-triazine-2,4,6-trithiol.

9. A reversible cell comprising the composite electrode of claim 1, a counter-electrode comprising lithium metal and an electrolyte capable of conducting Li$^+$ ions.

10. The reversible cell of claim 9 wherein the electrolyte is LiClO$_4$.

* * * * *